United States Patent [19]
Leckner et al.

[11] Patent Number: 5,985,157
[45] Date of Patent: Nov. 16, 1999

[54] FILTER DEVICE

[76] Inventors: Justin Paul Leckner, 703 Coatesville Riverhead Highway, RD3; Brendon Ross Poole, 211 Symonds Street; Che John Mearnes, 88A Pah Road, Cockle Bay, all of Auckland, New Zealand

[21] Appl. No.: 08/904,613

[22] Filed: Aug. 1, 1997

[51] Int. Cl.[6] .................................................. B01D 29/27
[52] U.S. Cl. .......................... 210/747; 210/162; 210/163; 210/170; 210/485
[58] Field of Search .................................... 210/747, 767, 210/162, 163, 164, 166, 170, 484, 485

[56] References Cited

U.S. PATENT DOCUMENTS

| | | | |
|---|---|---|---|
| 3,814,261 | 6/1974 | Morgan, Jr. | 210/484 |
| 4,419,232 | 12/1983 | Arntyr et al. | 210/164 |
| 4,871,454 | 10/1989 | Lott | 210/484 |
| 5,284,580 | 2/1994 | Shyh | 210/164 |
| 5,372,714 | 12/1994 | Logue, Jr. | 210/163 |
| 5,397,464 | 3/1995 | Hannon | 210/163 |
| 5,405,539 | 4/1995 | Schneider | 210/170 |

OTHER PUBLICATIONS

"Aqua Treatment Systems, Inc.", Stormwater and Wastewater Treatment Products, Seattle, Washington, 98134, 6 pages, 1996 & 1997.

*Primary Examiner*—Christopher Upton
*Attorney, Agent, or Firm*—Young & Thompson

[57] ABSTRACT

A filter device for removing suspended solids from storm water includes support device removably retainable in an entrance to a drain, a cage cooperating with the support means, filtration devices removably attachable to the support and suspended in the cage for removing suspended solids from storm water entering the drain.

8 Claims, 6 Drawing Sheets

FILTER DEVICE

FIELD OF THE INVENTION

This invention relates to an apparatus and method for improving the efficiency of pollution control in storm water drains and in particular, catchpits. Catchpits are a source of control for storm water pollution. The principal purpose of a catchpit is to convey runoff to the storm water system. Treatment is achieved by settling, however turbulence from incoming run off results in catchpits only removing approximately 5 per cent of suspended solids.

BACKGROUND OF THE INVENTION

In New Zealand, the current storm water maintenance program involves: street sweeping; catchpit cleaning and unblocking; storm water line cleaning and unblocking; and soakhole cleaning and repair work.

The limited ability of catchpits to remove sediment and debris results in a large amount of time and expense having to be spent on unblocking catchpits, storm water lines and soakholes to prevent flooding. The existing maintenance expenditure for the Auckland Central Business District is estimated at $900 hectare/year.

Typical storm water treatment devices, such as sedimentation ponds or sand filters, often require a large capital investment, land acquisition, and often cannot be incorporated into high urbanized.

Ground surfaces in an urban environment are contaminated by urban activities, in particular motor vehicle use. Most serious pollutants originate from motor vehicles for example exhaust emissions, brake linings, rubber heavy metals, oils, greases and complex organic compounds. In addition pollution in storm water can arise from the use of harmful biocides in agricultural, industrial and domestic applications. Also volatile solids enter the storm water system, whilst these primarily include plant materials, they also include animal faces, industrial waste, discarded food products, and other organics. These solids contain the pathogens, bacteria and nutrients that may adversely affect water quality.

A high proportion of suspended solids pass through existing drainage systems to streams or rivers and ultimately the marine environment.

Whilst primary prevention of contamination is very important it is also appropriate to consider systems for removal of pollution that does occur.

Control of contamination, in particular at the interface between a control system and the source, offers a practical and cost effective means of pollution control in urban environments.

Storm water runoff in urban environments is collected through drains which generally incorporate catchpits. Whilst catchpits are designed to retain a proportion of the sediment, their efficiency in this regard is limited, particularly at high rates of water flow and when the sediment level in the catchpit is close to the catchpit outlet.

Most catchpits in Auckland have been fitted with half siphons to prevent odors and to prevent sediment escaping into the storm water system. The half siphons which cause flow to travel vertically and make two 45 degree turns can also cause solids to be trapped and in turn the trapped solids trap more solids until the pipe is completely blocked. Blocked catchpits are air blasted and/or jetted out using a hydro blaster. However, some material may solidify in the half siphon and it becomes very difficult to completely remove this.

Occasionally the catchpit becomes blocked with concrete or cement making it impossible to unblock. When this occurs the catchpit must be dug up and replaced. These blockages can cause local flooding resulting in damaged public and private amenities. Unblocking catchpits and storm water lines requires significant maintenance expenditure each year.

A recent study performed by the Island Care New Zealand Trust estimated that 28,000 pieces of litter are discharged from Auckland City storm water systems per day.

OBJECT OF THE INVENTION

It is an object of the present invention to provide an apparatus and method for improving the efficiency of pollution control in storm water drains, or at least to provide the public with a useful alternative.

SUMMARY OF THE INVENTION

In one broad aspect of the present invention there is provided a filter device for removing suspended solids from storm water, said filter device comprising support means removably retainable in an entrance to a drain, a cage means cooperating with said support means, a filtration means removably attachable to said support means and suspended in said cage means for removing suspended solids from storm water entering the drain.

In a preferred form of the filter device of the present invention, adapted for use in a catchpit, said cage means is provided with projections which maintain said cage means away from inner sides of said drain.

Preferably the projections extend from all side of said cage means and almost abuts the inner sides of said drain.

In one preferred form of filter device of the present invention the support means comprises a frame defining an orifice, a sill forming upper surfaces of said frame which acts to direct storm water into said orifice and securing means for securing a part of said filtration means about said orifice.

In a further preferred form of the filter device of the present invention, for use in a catchpit, part of said sill, may be extended to form a back sill to direct water from a back opening catchpit into said orifice.

The filtration means may be formed from geotextile material, nylon mesh, or shade cloth; formed into a bag configuration and suspendable by an open end within said frame means.

In a further preferred form of filter device of the present invention, for use in a catchpit, the filtration means is of sufficient length to extend substantially to the bottom of the frame means. Preferably, the filtration means does not substantially restrict the flow of water through the catchpit.

According to a further aspect of the present invention there is provided a drain access to remove suspended solids from liquid entering a drain, said drain access comprising: a containing means having a base, sides, at least one outlet and support means removably retainable in an entrance to said drain and to support and suspend filtration means in the containing means, said filtration means for removing suspended solids from water entering the containing means.

In one preferred form of said drain access the frame means further incorporates a sill forming upper surfaces of said frame to direct liquid into an orifice in said frame, and securing means to secure part of said filtration means about said orifice.

The filtration means may be formed from geotextile material, nylon mesh or shade cloth; formed into a bag configuration and suspendable by an open end in said frame means.

Preferably the filtration means is of sufficient length to extend substantially to the bottom of the frame means. Preferably the filtration means does not substantially restrict the flow of liquid through the drain excess.

According to a further aspect of the present invention there is provided a method of removing suspended solids from storm water comprising suspended filtration means and cage means from a support means integrally formed with or removably retainable in an entrance to a drain, directing storm water into said filtration means and collecting suspended solids on said filtration means in said drain.

In one preferred form the method of the present invention may further comprise means to maintain said cage means away from the inner sides of said drain.

According to a further aspect of the present invention there is provided a filter device substantially as herein described and with reference to the accompanying drawings.

According to a further aspect of the present invention there is provided a method of removing suspended solids from liquid substantially as herein described and with reference to the accompanying drawings.

BRIEF DESCRIPTION OF THE DRAWINGS

Other aspects of the present invention may become apparent from the following description which has given by way of example only and with reference to the accompanying figures in which.

DETAILED DESCRIPTION OF THE INVENTION

Figure 1:
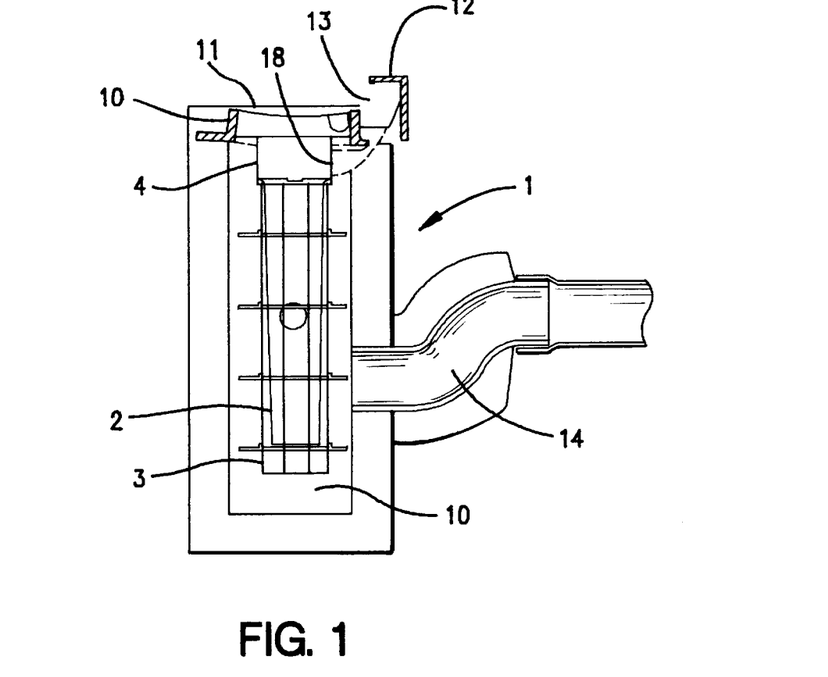
FIG. 1: shows a cross section through a filter device of the present invention positioned in a catchpit.
Figure 2:
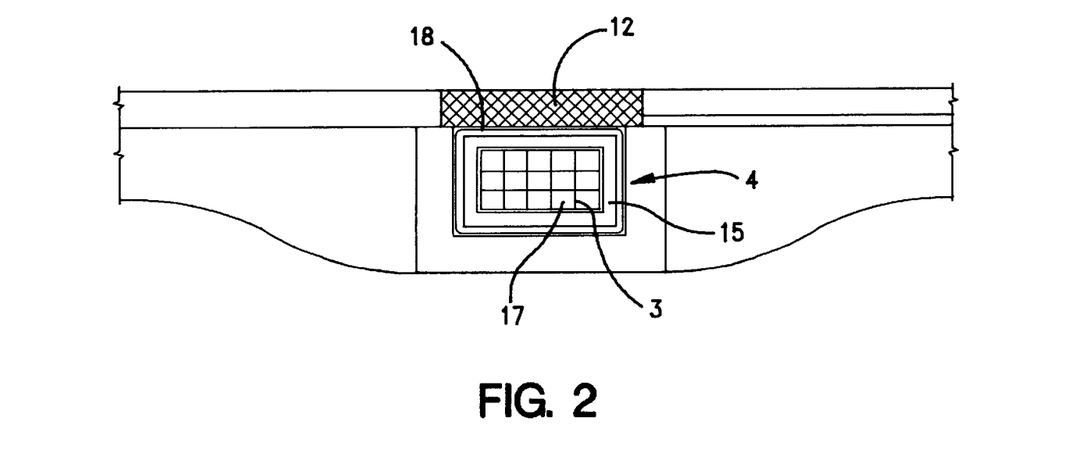
FIG. 2: shows a plan view from above of a support means of the filter device of the present invention.

Referring to FIG. 1 a filter device 1 of the present invention may comprise a filtration means 2, cage means 3 and support means 4.

Figure 3:
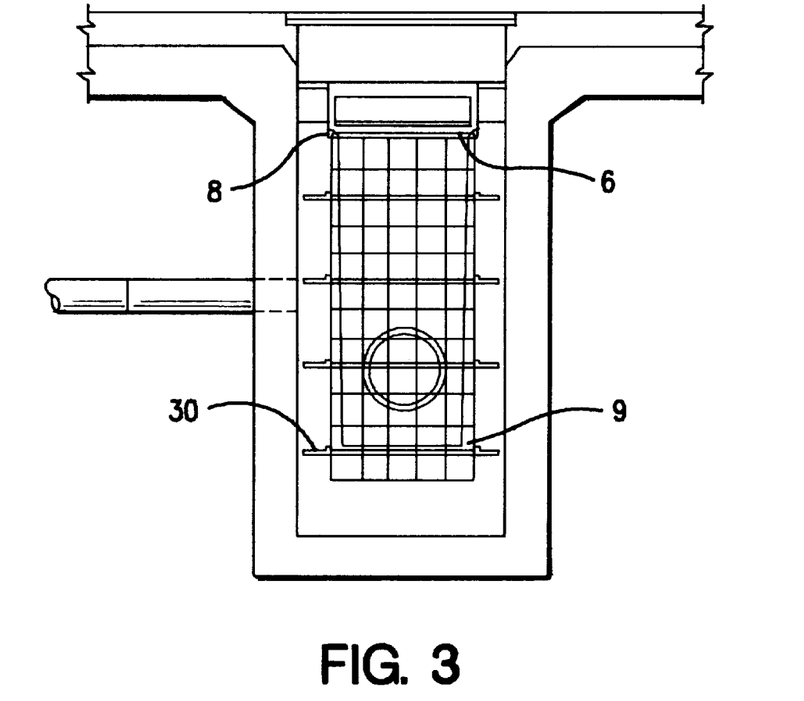
FIG. 3: shows a cross section through a filter device of the present invention illustrating support means.
Figure 4:
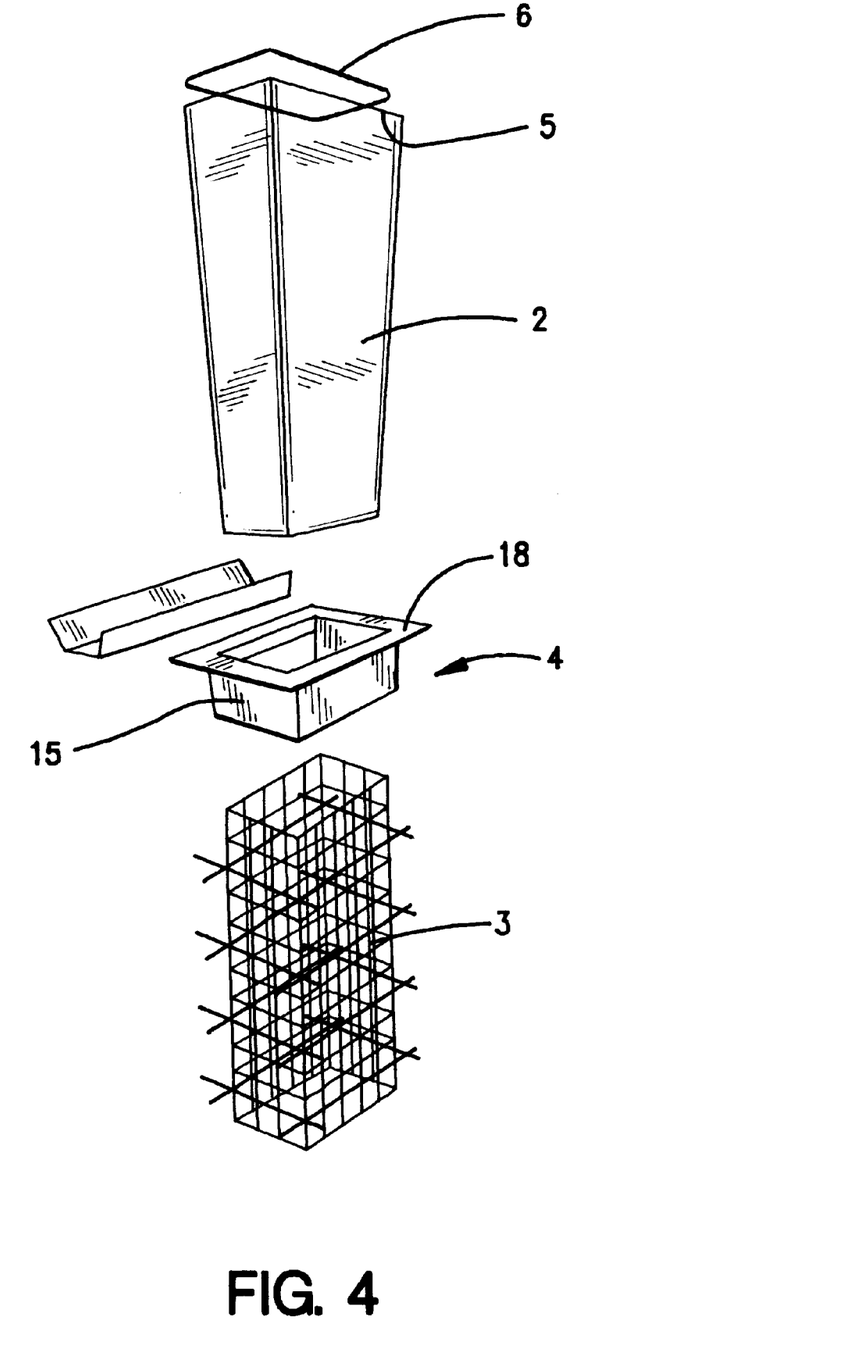
FIG. 4: shows an exploded view of a filter device of the present invention incorporating filtration means, support means and cage means.
Figure 10:
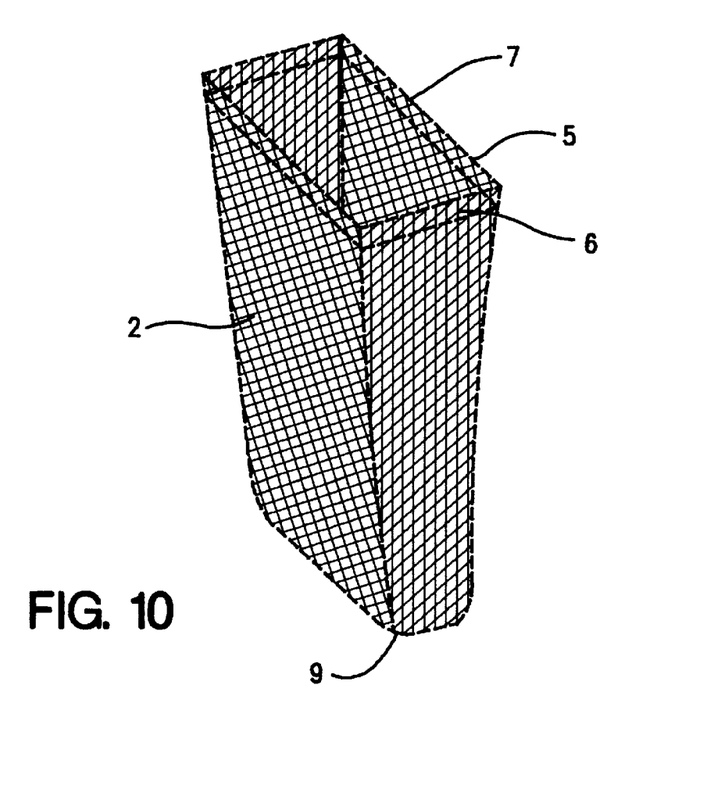
FIG. 10: shows a perspective view of the filtration means used with the present invention.

The filtration means 2 is made from a geotextile material or nylon material or shade cloth, suitable for the filtration of suspended solids from water passing through the material. In FIG. 10 the filter material is formed into an elongate bag-configuration. The upper end 5 of the filtration means 2 is open and affixed or securable to the support means 4 by means of a steel support ring 6 placed in a sewn loop 7 at the top of the bag. In FIG. 3 the steel ring 6 sits on a lip 8 built in to the support means 4. This allows the filter bag 2 to be removed easily and the steel support ring 6 can also be removed from the filter bag 2 for washing. The bottom 9 of the filtration means 2 extends substantially to the bottom of the cage means 3.

The filtration means 2 may be formed into the required bag shape by sewing or such other like method which provides substantially sealed seams.

FIG. 1 shows a filter device 1 of the present invention positioned in a storm water drain having a catchpit 10, a gate 11, a curb edge 12, and overflow opening 13 and an outlet 14.

The support means 4 of a filter device of the present invention is positioned in catchpit 10 beneath grate 11 and held in position by lugs (not shown) on the catchpit frame 10 which stop the grate 11 from falling through. Where the catchpit has no lugs the cage 3 must extend to the bottom of the catchpit and the support means then abuts on the cage 3. In this case the cage has a base to prevent the bottom 9 of the filter bag 2 from abutting the bottom of the catchpit.

Referring now to FIGS. 2 to 9 the support means 4 comprises a frame 15 and a sill 16 abutting an upper surface of the frame 15. The sill 16 is adapted to direct water into the orifice 17 of frame 15 and prevent the passage of water into the catchpit except via the cage means 3. An opening 18 is adapted to direct water into the orifice 17 from an backflap 19 (see FIG. 9) positioned in a storm water drain via flexible chute 25.

Figure 5:
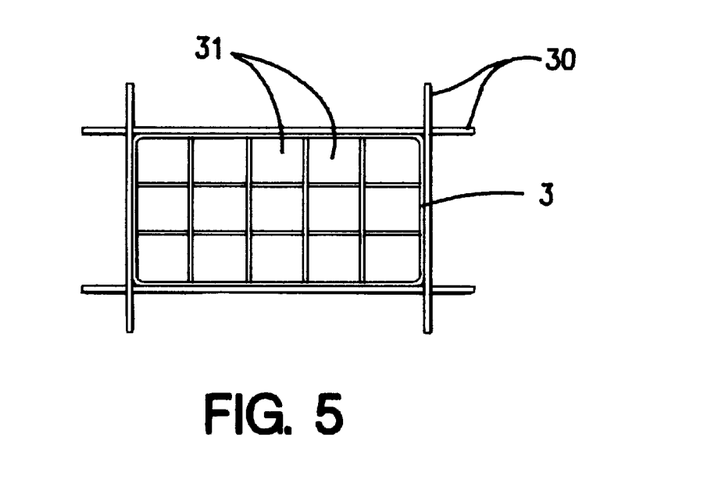
FIG. 5: shows a plan view of the case means used with the present invention illustrating the projections.
Figure 6A:
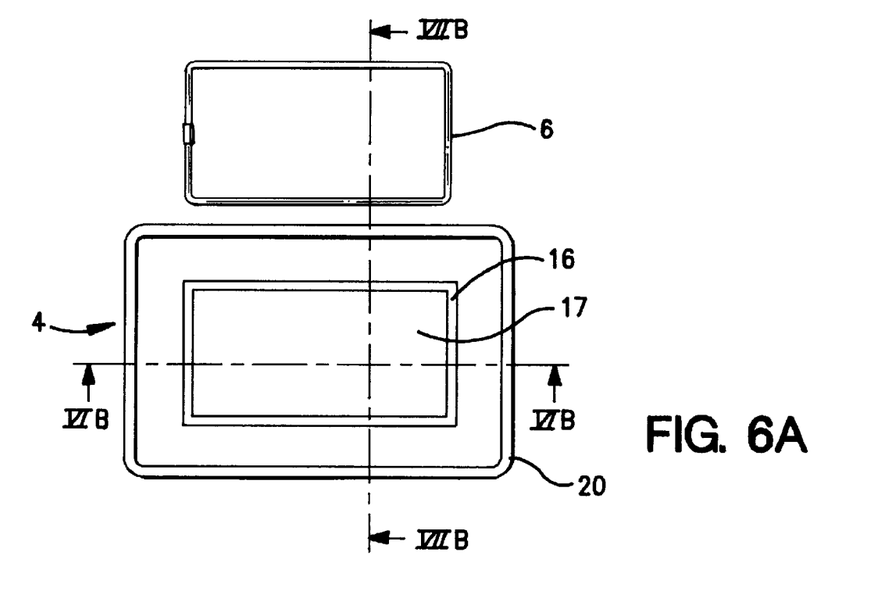
FIG. 6A: shows a plan view of the support means used with the present invention.
Figure 6B:
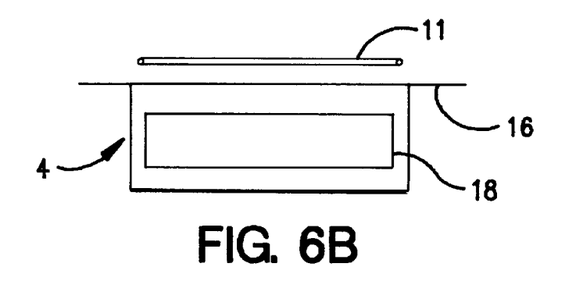
FIG. 6B: shows a side view of the support means used with the present invention.
Figure 7A:
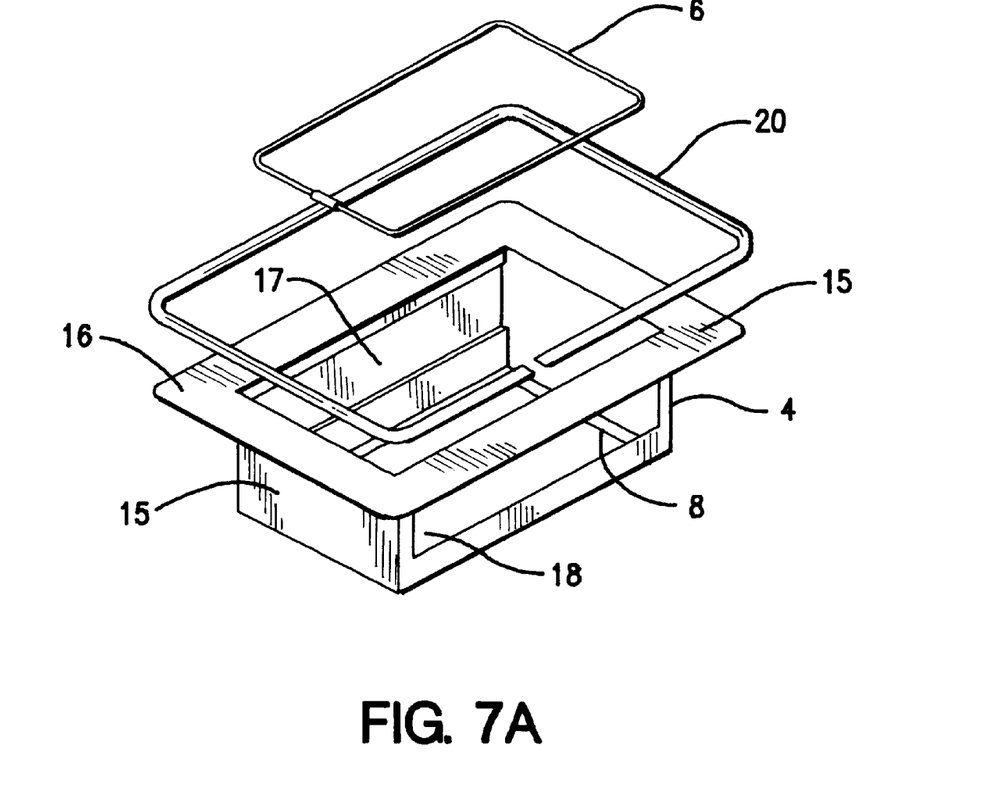
FIG. 7A: shows an exploded view of the support means used with the present invention.
Figure 7B:
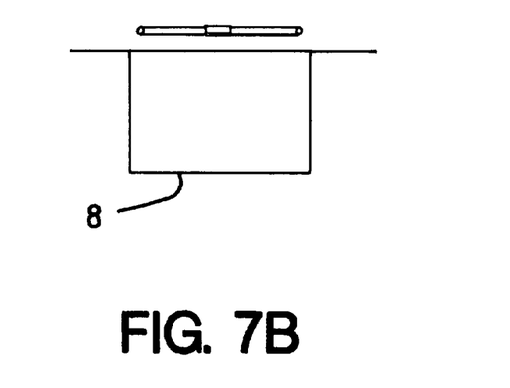
FIG. 7B: shows a section view of the support means used with the present invention.
Figure 8A:
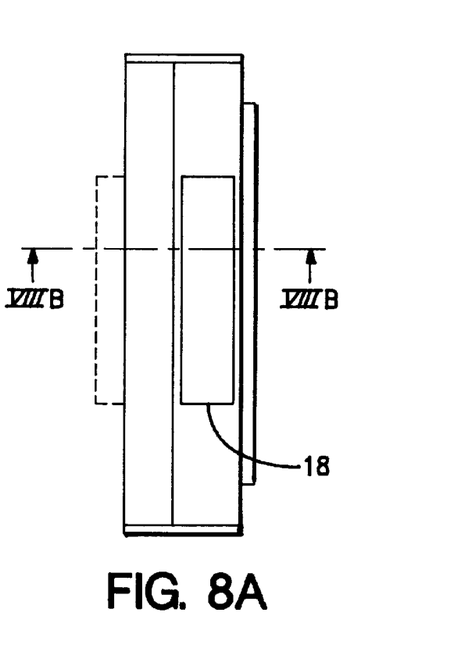
FIG. 8A: shows a section view of the support means along the lines A—A in FIG. 6A.
Figure 8B:
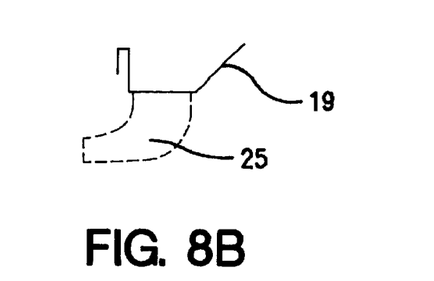
FIG. 8B: shows a side view of the overflow used with the present invention.
Figure 9:
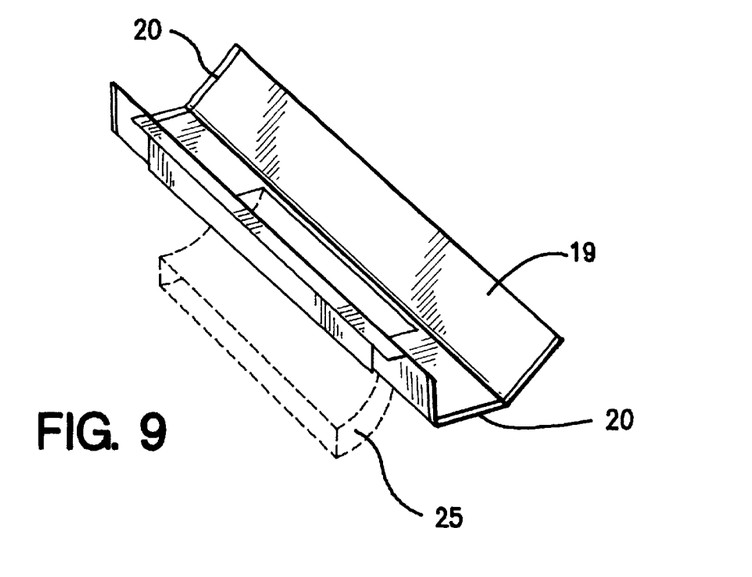
FIG. 9: shows a perspective view of the overflow used with the present invention.

The cage 3 includes projections 30 adapted to maintain the cage 3 away from the side walls of the catchpit. This is particularly important when the cage filter bag is full and may partially protrude through the cage 3. Without the projections 30 the cage 3 could be forced against the outlet causing a blockage. The projections maintain a water flow around the cage. The cage 3 has large spacings 31 to minimize the surface area of the cage and maximize the filter bag area.

The backflow 19 may also include boot seal rubber 20 (see FIG. 9), to ensure a snug fit, placed on the ends of the backflap which can be pushed firmly into place and the front of the backflap 19 is designed to clip over the existing cast iron grate of the drain.

In the embodiment shown in the drawings, the support means has a rectangular configuration with a sill on each side, including an extended sill on one longitudinal side. However, it will be appreciated that the invention is not restricted to any particular shape of support means, different shapes being required for drains or catchpits having other than a rectangular cross-section.

A filter device of the present invention may be quickly and easily retrofitted into existing storm water drains by raising the grate, locating the filtration means into the catchpit and slotting the support means into the top part of the catchpit. Where the drain includes a backflow opening the backflap should be positioned in the back opening first.

Collected sediment may be removed, either by conventional suction means with the filter device retained within the catchpit, or by temporary removal or replacement of the storm water filter device, or at least the filtration means, for cleaning and disposal of the sediment in an appropriate manner.

In a pilot Study Report prepared by City Design for Auckland City Council (unpublished) June 1997 two field trials were performed to determine overall sediment removal efficiency and to determine hydraulic performance. The first trial involved 22 catchpits with filter devices of the present invention installed therein. Various grades of Bidim geotextile were the filter medium. The second trial used 3 pairs of catchpits in similar catchments and a control catchpit, and utilized various filter media such as Bidim geotextile, nylon (100 micron pore size) nylon (300 micron pore size) and shade cloth.

The removal efficiencies were determined by collecting samples of materials removed by the filter bags and their hydraulic performance was determined by taking field measurements over time.

Results

The Bidim geotextiles had a greater removal of suspended solids (63%–77%) than the nylon mesh, which removed 32%–48%.

The control catchpit, without a filter device installed, removed between 5%–6%.

A surprising result was that the nylon mesh was partially self-cleaning with water flushing the dry solids adhering to the sides of the bag into the base of the bag. This did not occur for the geotextile bags because of the fibrous nature of the bag.

Whilst the geotextile bags had the greatest degree of suspended solid removal they also clogged more easily and exhibited reduced hydraulic efficiency than the nylon mesh bags.

Over time the filter bag clogs and loses permeability. When inflow exceeds outflow, the water level in the bag slowly rises until flow bypasses the filter through the overflow. Under overflow conditions the static water level was much higher than normal which resulted in less turbulence. This aids the settling of particles and prevent re-suspension of particles, improving removal efficiency. As some flow was still passing through the filter bag there was a "suction" effect within the bag which drew the suspended particles downwards reducing particle re-suspension.

The study also showed that the filter device of the present invention could provide significant removal of heavy metals, ie. cadmium, copper, lead, zinc and mercury whether dissolved or attached to sediment from storm water.

Heavy traffic on roads caused the most pollution and optimally required that a geotextile bag would have to be replaced on a weekly basis.

In respect of accommodating runoff generated from a 1 in 1 year design storm from a catchpit and replacing bags when their permeability drops below this yielded the following life of a bag.

| Bidim geotextile | 1 to 7 weeks |
| Nylon mesh (100 micron) | 3 to 12 weeks |
| Nylon mesh (300 microns) | 6 to 12 weeks |
| Shade cloth 3 mm | 12+ weeks |

An advantage of the nylon mesh over the geotextile is that the nylon mesh can be cleaned and re-used.

From these results it is clear that the filter device of the present invention not only provides for source control of pollutants, but also substantially reduces maintenance costs associated with cleaning line blockages through sediment build-up.

Whilst the invention has been described with reference to a storm water filter device which may be retrofitted in existing storm water drains with a catchpit, it will be appreciated that new or replacement storm water drains or catchpits may be designed with the frame means integrally informed as an upper part of the drain or catchpit. In such embodiments of the invention the filtration means would be secured in the support means in a removable manner, to facilitate cleaning of the filtration means or disposal of damaged filtration means.

Furthermore, whilst the invention has been described with reference to storm water drains it will be appreciated that a filter device of the present invention may be employed in any type of drain where there is a need for pollution control and, in particular, the removal of suspended solids from a liquid, such an example is a soak hole which has an outlet at the bottom which is a bore down to the acquifer or fractured rock. In soak hole applications it is important that the bottom of the filter bag is held above the bottom of the soak hole.

Where in the foregoing description reference has been made to specific components or integers of the invention having known equivalents then such equivalents are herein incorporated as if individually set forth.

Although this invention has been described by way of example and with reference to possible embodiments thereof it is to be understood that modifications and variations may be made thereto without departing from the scope or spirit of the invention.

We claim:

1. A filter device for removing suspended solids from storm water, said filter device comprising a support means removably retainable in an entrance to a drain, a cage means cooperating with said support means, a filtration means removably attachable to said support means and suspended in said cage means for removing suspended solids from storm water entering the drain.

2. The filter device as claimed in claim 1 further comprising projections which maintain said cage means away from side walls of said drain.

3. The filter device as claimed in claim 2 wherein said projections extend from all sides of said cage and almost abut the side walls of said drain.

4. The filter device as claimed in claim 1 wherein the support means comprises a frame defining an orifice, a sill forming upper surfaces of said frame which acts to direct storm water into said orifice and securing means for securing a part of said filtration means about said orifice.

5. The filter device as claimed in claim 4 wherein part of said sill is extended to form a back sill to direct storm water from a back opening catchpit into said orifice.

6. A method of removing suspended solids from storm water comprising suspending filtration means and separate cage means from a support means integrally formed with or removably retainable in an entrance to a drain; directing storm water into said filtration means; and collecting suspended solids on said filtration means in said drain.

7. The method of removing suspended solids from storm water as claimed in claim 6 wherein said cage means has projections which maintain said cage means away from side walls of said drain.

8. The method of removing suspended solids from storm water as claimed in claim 7 wherein said projections extend from all sides of said cage and almost abut the side walls of said drain.

* * * * *

UNITED STATES PATENT AND TRADEMARK OFFICE
CERTIFICATE OF CORRECTION

PATENT NO. : 5,985,157
DATED : November 16, 1999
INVENTOR(S) : Justin Paul LECKNER et al.

It is certified that error appears in the above-indentified patent and that said Letters Patent is hereby corrected as shown below:

On the title page, insert Item [30] as follows:

--[30]  Foreign Application Priority Data

August 1, 1996     [NZ]     New Zealand.......299114--.

Signed and Sealed this

Twenty-fifth Day of April, 2000

Attest:

Q. TODD DICKINSON

Attesting Officer

Director of Patents and Trademarks